April 8, 1958   D. P. WAGNER   2,829,696
SCREW FOR PREASSEMBLY WITH WORKPIECES
Filed Nov. 23, 1955
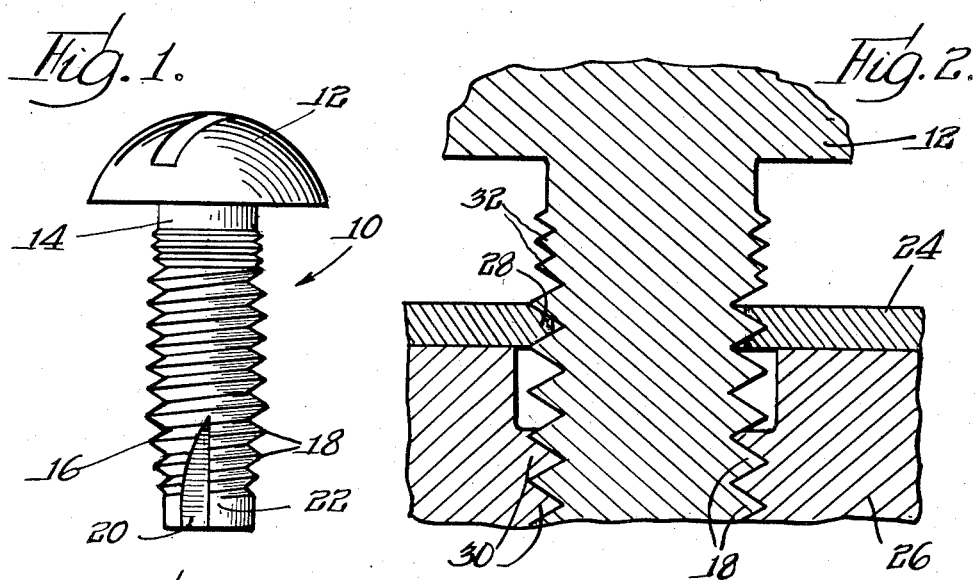
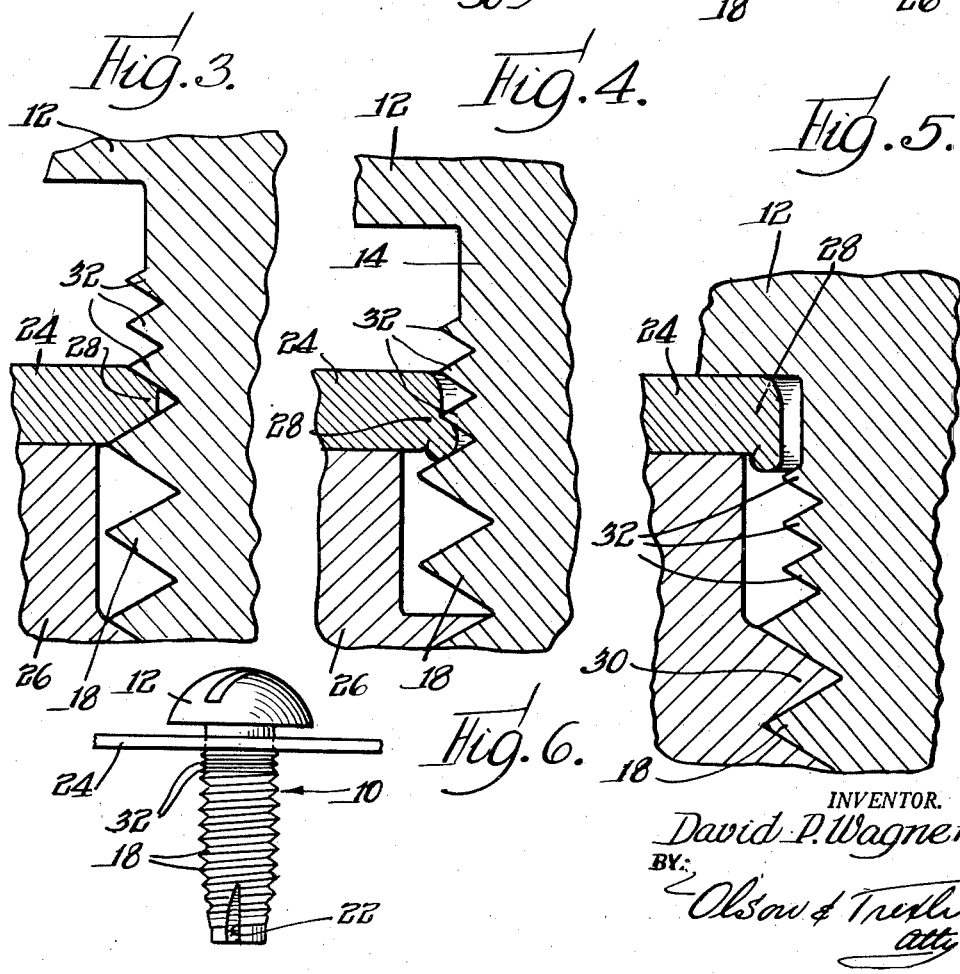
INVENTOR.
David P. Wagner
BY
Olson & Trexler
attys United States Patent Office 2,829,696
Patented Apr. 8, 1958

2,829,696

SCREW FOR PREASSEMBLY WITH WORKPIECES

David P. Wagner, Elmhurst, Ill., assignor to Illinois Tool Works, Chicago, Ill., a corporation of Illinois Application November 23, 1955, Serial No. 548,620

3 Claims. (Cl. 151—69)

The present invention relates to a novel screw member, and more particularly to a screw member adapted to be retained in permanently assembled relationship with an apertured workpiece.

There are many structures wherein a workpiece such as a cap, cover, or panel is removably secured to another member by means of screws, and inconvenience and delay often arises during assembly or disassembly of such a workpiece from the member whenever a workman drops or looses one of the screws. It is, therefore, an object of the present invention to provide a novel screw which may be easily and permanently assembled with an apertured workpiece in a manner which enables the screw to be freely rotated relative to the workpiece and to be freely shifted axially a limited distance relative to the workpiece so that the screw may be repeatedly tightened and loosened with respect to a complementary threaded member, if desired.

A more specific object of the present invention is to provide a novel screw of the above described type which may be threaded through an apertured workpiece, and which then functions to mutilate the workpiece threads sufficiently to prevent the screw from being completely withdrawn through the workpiece aperture.

Another more specific object of the present invention is to provide a novel screw which is constructed so as initially to form helical thread convolutions in an apertured workpiece to permit an entering end of the screw to pass through the workpiece and then mutilate such thread convolutions so as to prevent the entering end of the screw from being withdrawn through the workpiece.

Other objects and advantages of the present invention will become apparent from the following description and the accompanying drawings wherein:

Fig. 1 is an elevational view of a screw member constructed in accordance with the present invention;

Fig. 2 is an enlarged fragmentary sectional view showing an entering end portion of the novel screw member threaded through an apertured workpiece with which it is to be permanently assembled and partially threaded into a second member to which the workpiece is to be removably secured;

Fig. 3 is a further enlarged fragmentary sectional view similar to Fig. 2;

Fig. 4 is a fragmentary sectional view similar to Fig. 3 but showing the screw member advanced further into the workpiece so as to mutilate a portion of the workpiece thread;

Fig. 5 is a fragmentary sectional view showing the screw member fully applied to the workpiece and the member to which the workpiece is secured; and Fig. 6 is an elevational view on a reduced scale showing the novel screw member in permanently assembled relationship with the apertured workpiece.

Referring now more specifically to the drawings wherein like parts are designated by the same numerals throughout the various figures, a screw member 10 incorporating the principles of the present invention comprises a head portion 12 and an axially extending shank 14. The shank includes an entering portion 16 having a plurality of helical thread convolutions 18 thereon. The screw member 12 shown for the purpose of illustrating the present invention is a thread cutting screw. Therefore, the helical thread convolutions adjacent the free end of the shank decrease in height to facilitate entry into a workpiece and a recess 20 is formed in the shank to provide a thread cutting edge 22 at a junction between the thread convolutions and a wall of the recess. However, it should be understood that the present invention is not limited to thread cutting screws and could be applied to non-thread cutting screws.

The screw member 12 is adapted to be applied in a conventional manner to an apertured workpiece 24 and another apertured member 26 as shown in Figs. 2 and 3. Helical thread convolutions 28, which define the aperture in the workpiece 24, have crest and root diameters which are respectively similar to the maximum root and crest diameters of the helical screw threads 18. The thread convolutions 28 and similar thread convolutions 30 in the member 26 may be either preformed or cut during the application of the screw member by the thread cutting edge 22. In accordance with the present invention, means is provided on the screw shank 14 for upsetting or mutilating the thread convolutions 28 in the workpiece 24 after the screw thread convolutions 18 have passed through the workpiece. More specifically, one or more annular protuberances or rings 32 are formed on a portion of the shank 14 trailing the entering end shank portion 16. The annular protuberances 32 lie in planes which are disposed substantially perpendicularly to the longitudinal axis of the shank so that the protuberances will not mate with the helical thread convolutions in the workpiece. Furthermore, the crest diameter of the protuberances or rings 32 falls between the maximum root and crest diameters of the screw thread convolutions 18 and is greater than the crest diameter of the internal thread convolutions 28 in the workpiece 24. Thus, as the screw, during its initial application to a workpiece, is advanced from the relative position shown in Figs. 2 and 3 through the position shown in Fig. 4 and to the position shown in Fig. 5, the annular protuberances or rings 32 deform and mutilate the thread convolutions 28 in the manner shown. As a result, the mutilated thread convolutions 28 define an aperture through the workpiece which has a diameter similar to the crest diameter of the annular protuberances or rings 32 and less than the maximum crest diameter of the screw thread convolutions 18 as shown in Fig. 5. Thus, when the screw member is loosened, the shank portion having the protuberances 32 thereon may pass freely through the aperture in the workpiece 24, but the relatively large diameter screw thread convolutions 18 are prevented from passing through the workpiece aperture whereby the screw member and the workpiece are permanently retained in assembled relationship.

While the preferred embodiment of the present invention has been shown and described herein, it is obvious that many structural details may be changed without departing from the spirit and scope of the appended claims.

The invention is claimed as follows:

1. A screw fastener including a shank portion, a head at one extremity thereof presenting a work clamping surface extending radially outwardly from said shank portion, said shank portion having a holding section provided with conventional thread convolutions extending from the vicinity of the entering end of the shank portion to a terminating position spaced axially from said clamping surface and cooperating with a complemental thread of at least one full convolution formed in the wall of an opening in a work panel of predetermined thickness, radially projecting annular work distorting means located on said shank portion between said clamping surface and the terminating position of said conventional thread convolutions and having a diameter greater than the crest diameter of the internal thread round the work panel aperture, the outer diameter of said work distorting means being less than the crest diameter but greater than the root diameter of said fastener's conventional thread convolutions, and an annular shank section extending axially from said clamping surface to said work distorting means and having a diameter less than the outer diameter of said work distorting means, the axial extent of said annular shank section being at least as great as the predetermined thickness of the work panel, and said work distorting means operating to swage the material of the work panel around the aperture therethrough to an axial thickness greater than the predetermined thickness of the work panel and further operating to assure concentric positioning of the screw and the conventional screw threads thereon upon retrograde movement of said screw relative to the panel and the mutilated aperture therein.

2. A screw fastener as defined in claim 1, wherein said annular work distorting means includes a plurality of adjacently positioned annular protuberances.

3. A screw fastener as defined in claim 1, wherein said annular work distorting means is positioned immediately adjacent the terminal portion of said conventional thread convolutions.

References Cited in the file of this patent

UNITED STATES PATENTS

| | | |
|---|---|---|
| 2,010,853 | Dyer | Aug. 13, 1935 |
| 2,255,997 | Hanneman | Sept. 16, 1941 |
| 2,272,178 | McDowell et al. | Feb. 10, 1942 |
| 2,278,377 | Cook | Mar. 31, 1942 |
| 2,321,378 | Green | June 8, 1943 |
| 2,407,741 | Goodby | Sept. 17, 1946 |